US012343896B2

(12) United States Patent
Itoh et al.

(10) Patent No.: US 12,343,896 B2
(45) Date of Patent: Jul. 1, 2025

(54) METHOD FOR PRODUCING MODIFIED WOOD-BASED MATERIAL, FURAN DERIVATIVE RESINIFICATION SOLUTION, AND MODIFIED WOOD-BASED MATERIAL

(71) Applicants: Furanwood Co., Ltd., Okayama (JP); KYOTO PREFECTURAL PUBLIC UNIVERSITY CORPORATION, Kyoto (JP)

(72) Inventors: Takafumi Itoh, Kyoto (JP); Hisashi Miyafuji, Kyoto (JP); Yuzo Furuta, Kyoto (JP); Keisuke Kojiro, Kyoto (JP); Hiroaki Horiyama, Kyoto (JP); Yukari Otsuka, Kyoto (JP); Fujio Ohara, Tsuyama (JP); Hiroki Ito, Tsuyama (JP); Yoshiko Yamazaki, Tsuyama (JP)

(73) Assignees: Furanwood Co., Ltd., Okayama (JP); KYOTO PREFECTURAL PUBLIC UNIVERSITY CORPORATION, Kyoto (JP)

( * ) Notice: Subject to any disclaimer, the term of this patent is extended or adjusted under 35 U.S.C. 154(b) by 207 days.

(21) Appl. No.: 18/006,995

(22) PCT Filed: Jul. 27, 2021

(86) PCT No.: PCT/JP2021/027813

§ 371 (c)(1),
(2) Date: Jan. 26, 2023

(87) PCT Pub. No.: WO2022/025089

PCT Pub. Date: Feb. 3, 2022

(65) Prior Publication Data

US 2023/0264382 A1 Aug. 24, 2023

(30) Foreign Application Priority Data

Jul. 29, 2020 (JP) ................................ 2020-128665

(51) Int. Cl.

| | |
|---|---|
| ***B27K 3/15*** | (2006.01) |
| ***B27K 3/08*** | (2006.01) |
| ***B27K 3/20*** | (2006.01) |
| ***B27K 3/32*** | (2006.01) |
| ***B27K 3/34*** | (2006.01) |
| ***B27K 5/00*** | (2006.01) |

(52) U.S. Cl.
CPC .................. *B27K 3/15* (2013.01); *B27K 3/08* (2013.01); *B27K 3/20* (2013.01); *B27K 3/32* (2013.01); *B27K 3/343* (2013.01); *B27K 5/001* (2013.01)

(58) Field of Classification Search
CPC ............... B27K 3/15; B27K 3/08; B27K 3/20
See application file for complete search history.

(56) References Cited

U.S. PATENT DOCUMENTS

| | | | | |
|---|---|---|---|---|
| 2002/0192400 | A1 | 12/2002 | Schneider | |
| 2005/0038182 | A1 | 2/2005 | Hermescec et al. | |
| 2006/0292366 | A1 | 12/2006 | Schneider | |
| 2010/0062276 | A1 * | 3/2010 | Van Rhijn ............. | B27K 3/153 427/397 |

FOREIGN PATENT DOCUMENTS

| | | | |
|---|---|---|---|
| CN | 107866884 | A | 4/2018 |
| JP | H05-138615 | A | 6/1993 |
| JP | 2005-533688 | A | 11/2005 |
| JP | 2010-526692 | A | 8/2010 |
| JP | 2010-526693 | A | 8/2010 |
| WO | 2004011216 | A2 | 2/2004 |
| WO | 2008140323 | A1 | 11/2008 |
| WO | 2008140324 | A1 | 11/2008 |
| WO | 2011096812 | A1 | 8/2011 |

OTHER PUBLICATIONS

International Preliminary Report on Patentability for related International Application No. PCT/JP2021/027813 dated Jan. 31, 2023 and its English Translation.
Office Action with a Search Report for corresponding Chinese Application No. 202180049958.8 issued Sep. 28, 2023.
Extended European Search Report (EESR) for corresponding European Application No. 21849954.9. issued Jan. 30, 2024.
Office Action for corresponding Japanese Application No. 2022-525383 dated Aug. 30, 2022 and its English Machine Translation.
Second Office Action with Search Report in corresponding Chinese Application No. 202180049958.8 issued Jun. 1, 2024 and its English machine translation.
International Search Report for related International Application No. PCT/JP2021/027813 mailed Oct. 19, 2021 and its English Translation.

* cited by examiner

*Primary Examiner* — Nathan T Leong
(74) *Attorney, Agent, or Firm* — Renner, Otto, Boisselle & Sklar, LLP

(57) ABSTRACT

A method of producing a wood-based material that is modified is provided. Specifically, there is provided a method of producing a wood-based material, comprising 1) a step of impregnating a wood-based material with a furan derivative resinification solution that comprises a furan derivative, an inorganic salt inhibiting polymerization of the furan derivative at normal temperature, and an inorganic salt accelerating polymerization of the furan derivative; and 2) a step of polymerizing the furan derivative in the furan derivative resinification solution impregnated into the wood-based material within the wood-based material by means of heating.

8 Claims, No Drawings

METHOD FOR PRODUCING MODIFIED WOOD-BASED MATERIAL, FURAN DERIVATIVE RESINIFICATION SOLUTION, AND MODIFIED WOOD-BASED MATERIAL

This application is a national phase of International Application No. PCT/JP2021/027813 filed Jul. 27, 2021, which claims priority to Japan Application No. 2020-128665 filed Jul. 29, 2020, the entireties of which are hereby incorporated by reference.

TECHNICAL FIELD

The present invention relates to a method of modifying a wood-based material, namely a method of producing a wood-based material that is modified (modified wood-based material). The present invention also relates to a solution for this production method, as well as a wood-based material modified by a treatment using the solution.

BACKGROUND ART

Examples of wood-based materials include hardwood materials and coniferous materials. For instance, tropical hardwood materials of some species are generally hard and strong against decay; therefore, they are used for interior materials such as furniture and flooring, exterior materials such as wood decks, and the like.

CITATION LIST

Patent Literature

Japanese Unexamined Patent Application Publication No. 2005-533688

SUMMARY OF INVENTION

Technical Problem

In order to make a wood-based material more suitable for use, it is considered modifying the wood-based material.

An object of the present invention is to modify a wood-based material.

Solution to Problem

The present inventors intensively studied the above-described problem and consequently discovered that a furan derivative resinification solution containing a combination of a furan derivative and specific inorganic salts has a superior stability as a solution for modifying a wood-based material, and a wood-based material can be imparted with preferred properties such as durability, hardness, and/or dimensional stability, by modification with the solution, thereby completing the present invention.

The present invention provides a method of producing a modified wood-based material, the method comprising:

1) impregnating a wood-based material with a furan derivative resinification solution that comprises a furan derivative, an inorganic salt inhibiting polymerization of the furan derivative at normal temperature, and an inorganic salt accelerating polymerization of the furan derivative; and
2) polymerizing the furan derivative in the furan derivative resinification solution impregnated into the wood-based material within the wood-based material by means of heating.

The present invention also provides a furan derivative resinification solution preferably used in the above-described production method. Specifically, the present invention provides a furan derivative resinification solution which is a solution for modifying a wood-based material and comprises: a furan derivative; an inorganic salt inhibiting polymerization of the furan derivative at normal temperature; and an inorganic salt accelerating polymerization of the furan derivative.

Further, the present invention provides a modified wood-based material obtained by the above-described production method. Specifically, the present invention provides a modified wood-based material which is a wood-based material modified by the above-described production method and comprises at least a polymerized furan derivative.

Effects of Invention

According to the present invention, a wood-based material can be modified.

More specifically, the furan derivative resinification solution used for modification has a superior stability as a solution, and a modification of a wood-based material with the solution can impart the wood-based material with preferred properties such as durability, hardness, and/or dimensional stability.

DESCRIPTION OF EMBODIMENTS

One embodiment of the present invention will now be described in more detail.

Those numerical values and ranges thereof that are mentioned in the present specification are intended to each include a lower or upper limit value itself, unless a particular term such as “less than” or “more than/larger than” is added thereto. In other words, for example, a numerical range of 1 to 10 can be interpreted to include “1” as a lower limit value along with “10” as an upper limit value.

[Findings, etc. Serving as Basis of Present Disclosure]

In recent years, trees such as tropical hardwoods have been over-harvested, and their depletion is viewed as a problem.

On the other hand, the accumulated amount of domestic conifers has been increasing, and it is demanded to develop a novel use of domestic coniferous materials and explore their added value. However, in order to use a domestic coniferous material as a substitute for a tropical hardwood material, it is required to implement appropriate care for at least one of the following matters. For example, in the case of using a coniferous material as a substitute for a hardwood material, it is necessary to improve the durability (e.g., resistance to wood-decay fungi and the like) and the hardness of the coniferous material. In addition, there are problems in the use of a highly durable and hard hardwood material as an exterior material such as a wood deck. That is, a wood material, particularly a high-density and hard wood material experiences a large dimensional change in association with a change in its moisture content, and this frequently results in warping and cracking; therefore, for the inhibition thereof, it is essential to take measures such as strongly fixing the wood material with thick bolts, and such a practice requires a great deal of time and labor. Besides, such thick bolts are often pulled out by a force causing the wood material to deform. A wood-based material to be used as, for example, an exterior material such as a wood deck is required to not only have a suitable durability but also exhibit a small dimensional change with fluctuations in the moisture content (i.e. a high dimensional stability). Moreover, hardness is also required for such a wood-based material in terms of being less likely to be cracked or damaged.

In the technology disclosed in Japanese Unexamined Patent Application Publication (Translation of PCT Application) No. 2005-533688, acetone or a low-boiling-point alcohol is used as a co-solvent. In a furan derivative monomer solution to which such a co-solvent is added, it cannot be said that polymerization of a furan derivative can be sufficiently inhibited at least during the storage of the solution at room temperature. An increase in the molecular weight of the furan derivative by polymerization during the storage, i.e., prior to being impregnated into a wood-based material, makes it difficult to more uniformly impregnate a wood-based material with the furan derivative. Therefore, in this technology, it may be said to be difficult to sufficiently impregnate a wood-based material (e.g., a wood-based material of domestic conifer such as cedar or cypress (Japanese cedar or Japanese cypress)) with the furan derivative. Moreover, even if the wood-based material is impregnated the furan derivative, satisfactory modification of the wood-based material is unlikely to be achieved.

The present disclosure encompasses a history of attempts that were made to solve the problems relating to relatively poor durability, hardness, and the like of domestic coniferous materials as compared to hardwood materials and the like, as well as the problems relating to high dimensional stability required for exterior materials and the like, by a modification of a wood-based material through resinification using a furan derivative.

[Production Method of Present Invention]

The present invention relates to the production of a modified wood-based material. In other words, the present invention provides a method of producing a modified wood-based material as a wood-based material modification method.

The production method of the present invention includes:

1) impregnating a wood-based material with a furan derivative resinification solution that contains a furan derivative, an inorganic salt inhibiting polymerization of the furan derivative at normal temperature, and an inorganic salt accelerating polymerization of the furan derivative; and
2) polymerizing the furan derivative in the furan derivative resinification solution impregnated into the wood-based material within the wood-based material by means of heating.

The term "furan derivative resinification solution" used herein refers to a liquid that is used for a treatment of incorporating a resin into at least some parts of a wood-based material mainly through polymerization of a furan derivative. In other words, the term "resinification" used herein refers to a mode in which a resin component substantially formed by polymerization of the furan derivative of the solution is incorporated into the wood-based material. Hereinafter, "furan derivative resinification solution" is also simply referred to and described as "solution".

The term "normal temperature" used herein refers to a temperature of an environment in which the temperature is not artificially changed by a person of ordinary skill in the art by means of heating, cooling or the like (e.g., ambient temperature), and typically means a temperature 15 to 35° C., for example, 20 to 30° C., or 23 to 27° C.

The term "heating" used herein refers to a mode of artificially increasing the temperature for the purpose of facilitating polymerization of the furan derivative in a preferred manner, and means to heat a wood-based material or its surrounding environment such that a temperature condition of, for example, 60° C. to 160° C., 60° C. to 120° C., 60° C. to 100° C., 80° C. to 160° C., or 80° C. to 120° C. is obtained. It is noted here that the term "temperature" used herein refers to such a temperature of a wood-based material or its surrounding environment; however, for the sake of simplicity and convenience, the term "temperature" may be deemed to mean a set temperature of an apparatus used for the production (e.g., a temperature set for a heating/warming means of a chamber). In the present disclosure, such heating may be continued for 2 to 240 hours, for example, 4 to 168 hours, 10 to 96 hours, 10 to 80 hours, or 10 to 48 hours. In a preferred mode, by such heating, not only the polymerization of the furan derivative impregnated into the wood-based material is accelerated in a more preferred manner, but also the wood-based material wetted with the furan derivative resinification solution is dried.

In the present disclosure, the "inorganic salt inhibiting polymerization of the furan derivative at normal temperature" contributes to stabilization of the furan derivative resinification solution. Accordingly, the present specification includes parts where the "inorganic salt inhibiting polymerization of the furan derivative at normal temperature" is referred to and described as "stabilizer".

In the present disclosure, the "inorganic salt accelerating polymerization of the furan derivative" acts in such a manner to accelerate the polymerization of the furan derivative at the time of, for example, resinification of the wood-based material that involves heating. Accordingly, the present specification includes parts where the "inorganic salt accelerating polymerization of the furan derivative" is simply referred to and described as "accelerator".

In the present disclosure, the "wood-based material" typically refers to a so-called wood material. The "wood-based material" may be, for example, a wood raw material to be used for a wood product. In other words, the wood-based material used in the production method of the present invention may be a wood material that is once processed or sawn from a raw wood to have a certain prescribed shape.

The furan derivative used in the production method of the present invention is not particularly limited and may be, for example, a derivative in which a hydrocarbon group (e.g., a hydrocarbon group having 1 to 40, 1 to 30, 1 to 20, 1 to 10, 1 to 8, 1 to 6, 1 to 4, 1 to 3, or 1 to 2 carbon atoms) is directly bound to a furan skeleton, namely a derivative substituted with such a hydrocarbon group. Examples of the furan derivative include furan substituted with at least one functional group selected from the group consisting of an alkyl group, a formyl group, a hydroxyl group, and a hydroxyalkyl group. The number of carbon atoms in each functional group such as an alkyl group, a formyl group, a hydroxyl group, or a hydroxyalkyl group, may be 1 to 20, for example, 1 to 10, 1 to 8, 1 to 6, 1 to 4, 1 to 3, 1 to 2, or 1. Further, the number of functional groups used for the substitution may be 1 to 4, for example, 1 to 3, 1 to 2, or 1, per molecule of the furan derivative.

The furan derivative used in the production method of the present invention may also be, for example, at least one polymerizable monomer selected from the group consisting of furfuryl alcohol, furfural, 5-hydroxymetyl furfural, and the like.

In a solution in which an aqueous solvent is used (particularly a solution in which a solvent containing 100% by weight of water is used), these polymerizable monomers are likely to exist stably with their polymerization being more effectively inhibited by the action of the stabilizer and, after the monomers are impregnated into the wood-based material, their polycondensation is accelerated by the action of the accelerator with heating, allowing the wood-based material to be resinified in a more preferred manner.

The concentration of the furan derivative in the furan derivative resinification solution may be usually 5 to 50% by weight (not inclusive of 50% by weight), for example, 5 to 45% by weight, 10 to 45% by weight, 20 to 45% by weight, to 40% by weight, or 25 to 35% by weight, based on the whole furan derivative resinification solution. Such a concentration of the furan derivative can assist a more preferred modification of the wood-based material. For example, by a modification treatment of the wood-based material with the solution, the wood-based material is likely to be imparted with at least one preferred property selected from the group consisting of more preferred durability (decay resistance and rot resistance), hardness (partial compressive strength), and dimensional stability.

The furan derivative resinification solution used in the production method of the present invention contains an "inorganic salt inhibiting polymerization of the furan derivative at normal temperature". By incorporating such an inorganic salt into the furan derivative resinification solution, for example, the furan derivative is stabilized in the solution at normal temperature. In other words, even when the solution is stored over a relatively long period (e.g., even when the solution is placed under normal temperature for a prolonged period), inconvenient polymerization of the furan derivative (inconvenient polymerization that can be recognized as, for example, turbidity or an insolubilization and/or separation phenomenon in the solution) is likely to be inhibited, so that the furan derivative resinification solution can be used in a state more suitable for a modification treatment. The "inorganic salt inhibiting polymerization of the furan derivative at normal temperature", through the inhibition of inconvenient polymerization of the furan derivative, allows the solution prior to being impregnated into the wood-based material to have a more preferred quality stability, so that variation in the properties imparted to the wood-based material by a treatment can be reduced in a more preferred manner. For example, variation in at least one property selected from the group consisting of durability, hardness (partial compressive strength), and dimensional stability can be reduced in a more preferred manner.

The "inorganic salt inhibiting polymerization of the furan derivative at normal temperature" may be, for example, an inorganic carbonate. In addition to or in place of this, the "inorganic salt inhibiting polymerization of the furan derivative at normal temperature" may have the form of, for example, an ammonium salt.

In a preferred mode, the "inorganic salt inhibiting polymerization of the furan derivative at normal temperature" may be at least one inorganic salt selected from ammonium carbonate, ammonium hydrogen carbonate, and the like. In short, the "inorganic salt inhibiting polymerization of the furan derivative at normal temperature" may be, for example, ammonium carbonate, ammonium hydrogen carbonate, or a combination of ammonium carbonate and ammonium hydrogen carbonate. This is because such an inorganic salt not only can inhibit inconvenient polymerization of the furan derivative in the solution at normal temperature and thereby allow the solution prior to being impregnated into the wood-based material to maintain a more preferred quality stability, but also can serve as an inorganic salt that does not inhibit the polymerization of the furan derivative during the post-impregnation heating. The expression "inhibiting polymerization" used herein means that, because of the presence of such an inorganic salt, the rate of polymerization reaction is reduced as compared to a case where the inorganic salt is absent (e.g., when polymerizable monomers exist by themselves), or the polymerization reaction is stopped.

The "inorganic salt inhibiting polymerization of the furan derivative at normal temperature" may be an inorganic salt that exhibits basicity in an aqueous solution (e.g., an aqueous solution at normal temperature), for example, an inorganic salt that makes the furan derivative resinification solution basic, or shifts the pH of the solution to the basic side (i.e. further increases the pH). Incidentally, it is believed to be possible to inhibit the polymerization of the furan derivative and maintain the stability of the furan derivative resinification solution, which is composed of the furan derivative, an inorganic salt that is neutral to weakly acidic at normal temperature and accelerates the polymerization of the furan derivative, and water, also by adding a salt such as sodium hydroxide and/or potassium hydroxide to the solution and thereby maintaining the solution to be basic; however, such a salt inconveniently inhibits the polymerization of the furan derivative during the subsequent heating. In other words, desired polymerization can be inhibited during a modification treatment of the wood-based material.

Salts that inhibit the polymerization of the furan derivative at normal temperature but do not inconveniently inhibit the polymerization of the furan derivative after the furan derivative resinification solution is impregnated into the wood-based material are limited to a certain extent; therefore, for example, a salt that is decomposed and gasified by heating and removed out of the reaction system may be used as well. Typical examples thereof include inorganic salts such as ammonium carbonate and ammonium hydrogen carbonate.

From the above-described viewpoint, it can be said that the above-described inorganic salt contained in the furan derivative resinification solution used in the production method of the present invention is preferably an inorganic salt that is decomposed and gasified by heating. In other words, the "inorganic salt inhibiting polymerization of the furan derivative at normal temperature" contained in the furan derivative resinification solution may be an inorganic salt that is decomposed by heating (more specifically, decomposed and gasified by heating) after the furan derivative resinification solution is impregnated into the wood-based material. From the same viewpoint, sodium hydroxide and potassium hydroxide are preferably excluded from the inorganic salt contained in the furan derivative resinification solution used in the production method of the present invention. In other words, the "inorganic salt inhibiting polymerization of the furan derivative at normal temperature" contained in the furan derivative resinification solution is preferably an inorganic salt other than sodium hydroxide and potassium hydroxide.

The content of the above-described inorganic salt may be adjusted as appropriate. The adjustment of the content makes it easy to control the extent of the polymerization of the furan derivative that is brought about by heating performed after the furan derivative resinification solution is impregnated into the wood-based material and, as a result, the sites of the generation of a furan resin in the cells of the wood-based material can be easily controlled. For example, an increase in the content of the "inorganic salt inhibiting polymerization of the furan derivative at normal temperature" in the solution is likely to control the polymerization degree of the furan derivative to be low, so that a low-molecular weight furan derivative resin is likely to be generated in the cell walls. On the other hand, for example, a reduction in the content of the "inorganic salt inhibiting polymerization of the furan derivative at normal temperature" is likely to control the polymerization degree of the furan derivative to be high, so that a high-molecular-weight furan resin is likely to be generated and accumulated in the intracellular spaces.

As described above, the inorganic salt used as a stabilizer is capable of inhibiting the polymerization of the furan derivative at normal temperature and thereby more preferably stabilizing the state of the furan derivative resinification solution prior to being impregnated into a wood material; therefore, a modification treatment with this solution can contribute to an improvement in the properties of the resulting modified wood-based material. In addition, variation in the finished condition of the modified wood-based material can be reduced, so that quality standardization of final products in which the modified wood-based material is used can be easily achieved.

In the present invention, in order to make it easier to impart desired properties to the wood-based material, polymerization in the solution may be taken into consideration as appropriate. As merely an exemplary mode, after the furan derivative resinification solution is impregnated into the wood-based material, the polymerization reaction in the wood-based material may be preferably accelerated by heating while, for example, controlling the molecular weight and the reactivity of a polymer (resin) generated in the early stage of the polymerization of the furan derivative and inhibiting the polymerization of the furan derivative in the furan derivative resinification solution at normal temperature.

In the furan derivative resinification solution, the concentration of the "inorganic salt inhibiting polymerization of the furan derivative at normal temperature" may be 0.01 mol or less, 0.005 mol or less, 0.004 mol or less, 0.003 mol or less, 0.002 mol or less, or 0.001 mol or less, with respect to 1 mol of the furan derivative contained in the solution (in this case, a lower limit value may be larger than 0 mol). For example, the concentration or amount of the "inorganic salt inhibiting polymerization of the furan derivative at normal temperature" in the furan derivative resinification solution may be 0.0001 to 0.004 mol, for example, 0.0003 to 0.003 mol, 0.0005 to 0.001 mol, 0.0006 to 0.001 mol, or 0.0007 to 0.0009 mol, with respect to 1 mol of the furan derivative contained in the solution. Such a concentration or amount of the "inorganic salt inhibiting polymerization of the furan derivative at normal temperature" can assist a more preferred modification of the wood-based material. For example, by a modification treatment of the wood-based material with the solution, the wood-based material is likely to be imparted with at least one preferred property selected from the group consisting of more preferred durability, hardness (partial compressive strength), and dimensional stability.

The furan derivative resinification solution used in the production method of the present invention contains other kind of inorganic salt in addition to the "inorganic salt inhibiting polymerization of the furan derivative at normal temperature". The furan derivative resinification solution contains, for example, an "inorganic salt accelerating polymerization of the furan derivative". By incorporating such an inorganic salt into the furan derivative resinification solution, the polymerization of the furan derivative in the solution is accelerated in a more preferred manner at the time of the heating performed for the modification treatment.

The "inorganic salt accelerating polymerization of the furan derivative" may be preferably an inorganic salt that accelerates the polymerization of the furan derivative by heating, particularly the heating performed in the step 2). The expression "accelerating polymerization" used herein means that, because of the presence of such an inorganic salt, the rate of polymerization reaction is increased as compared to a case where the inorganic salt is absent (e.g., when polymerizable monomers exist by themselves). This inorganic salt may be one which exhibits an acidity (e.g., weak acidity) in an aqueous solution (e.g., an aqueous solution at normal temperature), for example, an inorganic salt that shifts the pH of the furan derivative resinification solution to the acidic side (i.e. further reduces the pH). The inorganic salt may be, for example, one which is neutral to weakly acidic at normal temperature in the form of an aqueous solution, typically exhibiting a pH of 3 to 7 (not inclusive of "7"), for example, a pH of 4 to 6.5, or 5 to 6.

In the present disclosure, "pH" refers to a hydrogen ion exponent and may be, for example, a pH value measured in accordance with "JIS 28802 Methods for Determination of pH of Aqueous Solutions".

In the production method of the present invention, the "inorganic salt accelerating polymerization of the furan derivative" may be an inorganic salt formed of an anion such as a chloride ion and/or a sulfate ion, and a cation such as an ammonium ion, a magnesium ion, and/or a hydrogen ion. In other words, the other kind of inorganic salt that is contained in the solution in addition to the "inorganic salt inhibiting polymerization of the furan derivative at normal temperature" (e.g., ammonium carbonate and/or ammonium hydrogen carbonate) may be an inorganic salt formed of an anion such as a chloride ion and/or a sulfate ion, and a cation such as an ammonium ion, a magnesium ion, and/or a hydrogen ion (it may be said that such an inorganic salt can yield the above-described ions when dissolved in water). This inorganic salt can assist a more preferred modification of the wood-based material. For example, by a modification treatment of the wood-based material with the solution, the wood-based material is likely to be imparted with at least one preferred property selected from the group consisting of more preferred durability, hardness (partial compressive strength), and dimensional stability.

In a preferred mode, the "inorganic salt accelerating polymerization of the furan derivative" may be an inorganic salt that contains a combination of either a chloride ion or a sulfate ion and one or more selected from the group consisting of an ammonium ion, a magnesium ion, and a hydrogen ion as constituent elements.

The "inorganic salt accelerating polymerization of the furan derivative" may be, for example, at least one inorganic salt selected from the group consisting of magnesium chloride, ammonium chloride, ammonium sulfate, ammonium hydrogen sulfate, magnesium sulfate, magnesium hydrogen sulfate, and the like.

In the furan derivative resinification solution, the concentration or amount of the "inorganic salt accelerating polymerization of the furan derivative" may be, for example, 0.1 mol or less, 0.09 mol or less, 0.08 mol or less, 0.07 mol or less, 0.06 mol or less, 0.05 mol or less, 0.04 mol or less, 0.03 mol or less, or 0.02 mol or less, with respect to 1 mol of the furan derivative contained in the solution. In this case, a lower limit value may be larger than 0 mol. For example, taking a case where an upper limit value is 0.1 mol as an example, the concentration or amount of the "inorganic salt accelerating polymerization of the furan derivative" contained in the furan derivative resinification solution may be, for example, 0.001 to 0.1 mol, 0.002 to 0.1 mol, 0.003 to 0.1 mol, 0.004 to 0.1 mol, 0.005 to 0.1 mol, 0.006 to 0.1 mol, 0.007 to 0.1 mol, 0.008 to 0.1 mol, or 0.009 to 0.1 mol, with respect to 1 mol of the furan derivative. Such a concentration or amount of the "inorganic salt accelerating polymerization of the furan derivative" can assist a more preferred modification of the wood-based material. For example, by a modification treatment of the wood-based material with the solution, the wood-based material is likely to be imparted with at least one preferred property selected from the group consisting of more preferred durability (decay resistance and rot resistance), hardness (partial compressive strength), and dimensional stability.

The furan derivative resinification solution used in the present invention may be an aqueous system. In other words, the furan derivative resinification solution used in the production method of the present invention may be a solution that contains the above-described furan derivative, the above-described inorganic salt inhibiting polymerization of the furan derivative at normal temperature, the above-described inorganic salt accelerating polymerization of the furan derivative, and water as a solvent. Particularly, the solvent in the furan derivative resinification solution may be an aqueous medium. This means that the solvent contained in the solution substantially consists of water. In the present invention, a phrase "the solvent in the furan derivative resinification solution is an aqueous medium" means that the solvent contained in the solution is a solvent consisting of water as described above. In other words, the furan derivative resinification solution preferably contains only water as a solvent, and does not contain any organic solvent such as an alcohol (e.g., methanol, ethanol, or isopropanol) or acetone. In a simple preferred mode, it can be said that the furan derivative resinification solution used in the present invention does not contain any alcohol (e.g., lower alcohol such as methanol, ethanol, or isopropanol), acetone, or the like.

More specifically, the solvent in the furan derivative resinification solution may be a simple solvent consisting of water by itself, not a solvent composed of a mixture. The solvent in the furan derivative resinification solution used in the present invention does not contain any organic solvent and thus may be referred to as, for example, "non-organic solvent" (particularly, an aqueous medium containing 100% by weight or 100% by volume of water as a non-organic solvent).

When the solvent of the furan derivative resinification solution is an aqueous solvent consisting of water, modification of the wood-based material can be performed in a more preferred manner, so that the effects of the present invention can be exerted more prominently. Without being bound to a specific theory, this is believed be related to that the furan derivative contained in the furan derivative resinification solution is more likely to reach further into the wood-based material as compared to a case where the solution contains an alcohol, acetone, or the like as a solvent. One of the factors of this is believed to be, also without being bound to a specific theory, that water used as the aqueous solvent has a higher polarity and/or a smaller molecular weight than alcohols (e.g., lower alcohols), acetone, and the like, and a 100%-water aqueous solvent more easily permeates into the cell walls of a wood material than a solvent containing an alcohol, acetone, or the like. The use of such an aqueous solvent not only can further reduce the cost of carrying out the production method of the present invention, but also is likely to be relatively advantageous in terms of safety, environmental conservation, and the like as compared to a case of using an organic solvent.

In the present invention, water used as an aqueous solvent (i.e. an aqueous medium consisting of water as a solvent) is not particularly limited in terms of its type, and any medium that is generally recognized as water can be used. As merely an example, water used as an aqueous solvent may be at least one selected from the group consisting of tap water, purified water, groundwater, river water, rain water, deionized water, distilled water, and the like.

The wood-based material subjected to the production method of the present invention is not particularly limited, and any material that corresponds to a so-called wood material can be used. The wood-based material subjected to the production method of the present invention may be, for example, at least one domestic coniferous material selected from the group consisting of Japanese cedar (*Cryptomeria japonica*), Japanese cypress (*Chamaecyparis obtusa*), pine (*Pinus* L.) Japanese Larch (*Larix kaempferi*), Yezo spruce (*Picea jezoensis* var. *jesoensis*), Sakhalin fir (*Abies sachalinensis*), southern Japanese hemlock (*Tsuga sieboldii*), momi fir (*Abies firma*), and the like. The wood-based material may also be, for example, at least one exotic coniferous material selected from the group consisting of southern yellow pine (*Pinus echinata*), radiata pine (*Pinus radiata*), Scots pine (*Pinus sylvestris*), Chinese fir (*Cunninghamia lanceolata*), Douglas fir (*Pseudotsuga menziesii*), and the like. Moreover, as the wood-based material, it is also possible to use any of the followings: solid hardwood materials such as fast-growing but soft poplar (*Populus tremula* L.) and chanaberry (*Melia azedarach*); wood-based materials that have been processed to a certain extent, such as laminated wood, plywood, laminated veneer lumber, particle boards, and fiber boards, as well as laminae (sawn boards), veneers, wood chips, wood powder, and food fibers (pulp) that constitute the wood-based materials; and non-woody lignocellulose materials such as bamboo materials.

The wood-based material modified by the production method of the present invention may be used in various products for indoor and/or outdoor use. For example, the wood-based material modified by the production method of the present invention may be used for furniture, flooring materials, wood decks, exterior walls, louvers, truck bodies, musical instruments, interior materials, and exterior materials.

In a preferred mode, the wood-based material is a coniferous material. In this case, the effects of the present invention can be more prominent. This is because, although such wood-based materials are naturally limited in use due to, for example, low durability and/or low hardness (partial compressive strength), these properties are improved by the production method of the present invention, enabling to apply the wood-based materials to a wider range of applications. The coniferous material may be, for example, a cedar (Japanese cedar) material and/or a cypress (Japanese cypress) material. The Japanese cedar material and/or the Japanese cypress material may be those corresponding to domestic coniferous materials, and this preferably contributes to the development of a novel use of domestic conifers and the demand for added value.

As merely an example, the wood-based material to be subjected to a modification treatment (i.e. wood-based material prior to modification, or unmodified wood-based material) may be adjusted to have a moisture content of 30% by weight or less, for example, 25% by weight or less, 20% by weight or less, or 15% by weight or less, based on a total weight of the wood-based material (in this case, a lower limit value may be 0% by weight or more).

As described above, the furan derivative resinification solution used in the production method of the present invention preferably contains two kinds of salts as solute components other than a furan derivative. In other words, the furan derivative resinification solution used in the step 1) contains a combination of two kinds of salts, which are a “salt inhibiting polymerization of the furan derivative at normal temperature” and a “salt accelerating polymerization of the furan derivative”. Particularly, the furan derivative resinification solution used in the production method of the present invention is a solution that contains a combination of a first inorganic salt capable of acting as a “stabilizer” and a second inorganic salt capable of acting as an “accelerator”. It may be said that such a solution can assist a more preferred modification of the wood-based material and, for example, by a modification treatment of the wood-based material with the solution, the wood-based material is likely to be imparted with at least one property selected from the group consisting of more preferred durability, hardness (partial compressive strength), and dimensional stability. In a preferred mode, the first inorganic salt may be an inorganic salt that inhibits polymerization of the furan derivative at normal temperature but is decomposed by the heating and/or warming (e.g., warming at the below-described “initial set temperature”) in the step 2) (e.g., an inorganic salt that is decomposed and gasified).

Preferably, such a combination of the first inorganic salt (an inorganic salt inhibiting polymerization of the furan derivative at normal temperature) and the second inorganic salt (an inorganic salt accelerating polymerization of the furan derivative) constitutes a solution along with the furan derivative and an aqueous solvent (a solvent containing only water without any organic solvent). Particularly, as described above, the furan derivative resinification solution that contains a combination of the first inorganic salt and the second inorganic salt along with a simple solvent consisting of water by itself can make the effects of the modification treatment of the wood-based material more prominent.

In the production method of the present invention, a treatment of impregnating the wood-based material with the furan derivative resinification solution is performed as the step 1). A means therefor is not particularly limited as long as it contributes to the impregnation. For example, a chamber to which the wood-based material and the furan derivative resinification solution can be added may be used. In the step 1), for example, a method of immersing the wood-based material in the furan derivative resinification solution, a method of spraying or coating the wood-based material with the furan derivative resinification solution, and/or a method of impregnating the furan derivative resinification solution into the wood-based material under a reduced pressure and/or pressurized condition may be employed.

When the wood-based material is of a thin geometry or a small size as in the case of a veneer, wood chips, wood powder and/or wood fibers (pulp), or the like, desired impregnation can be easily achieved through a treatment such as immersion, coating, or spraying. Meanwhile, when the wood-based material has certain or larger cross-sectional dimension as in the case of a solid wood material or a lamina, desired impregnation can be easily achieved by employing a so-called vacuum pressure impregnation method, which is an impregnation treatment under a reduced pressure and/or pressurized environment.

In other words, the step 1) may be performed under a reduced pressure of lower than the atmospheric pressure. This reduced pressure condition may vary depending on the shape and/or the size of the wood-based material subjected to a modification treatment; however, it may be, for example, a reduced pressure condition of lower than the atmospheric pressure up to 10 hPa in a temperature range of lower than room temperature. Such a reduced pressure condition can assist the impregnation of the solution into the wood-based material in a more preferred manner and, for example, by a modification treatment of the wood-based material with the solution, the wood-based material is likely to be imparted with at least one preferred property selected from the group consisting of more preferred durability, hardness (partial compressive strength), and dimensional stability. The reduced pressure condition of the step 1) (e.g., chamber internal pressure) may be, for example, 100 to 10 hPa, 75 to 10 hPa, 50 to 10 hPa, 40 to hPa, or 40 to 20 hPa. The duration of subjecting the wood-based material to the solution under the reduced pressure condition is typically 5 minutes to 16 hours, for example, 30 minutes to 16 hours, 1 hour to 16 hours, 1 hour to 8 hours, 1 hour to 4 hours, or 1 hour to 3 hours.

In the production method of the present invention, an atmospheric pressure condition or a pressurized condition may be employed as appropriate. For example, a pressure treatment may be performed after the above-described reduced-pressure treatment. In this treatment, the atmospheric pressure or a higher atmosphere pressure may be used. For example, a pressure condition (e.g., chamber internal pressure) of 0.1 to 3 MPa or 0.3 to 2 MPa may be used. The duration of subjecting the wood-based material to such a pressure or pressurized condition may be typically 15 minutes to 72 hours, for example, 30 minutes to 36 hours, or 1 hour to 12 hours.

In the production method of the present invention, as the step 2), a heat treatment is performed to allow the furan derivative impregnated into the wood-based material to polymerize in the wood-based material. The polymerization of the furan derivative of the furan derivative resinification solution in the wood-based material is accelerated by heating, and the wood-based material can be modified by a resin component generated as a result of the polymerization.

A means for the heating of the step 2) is not particularly limited as long as it can increase the temperature of the wood-based material impregnated with the solution. The heating of the step 2) may be performed by, for example, raising the temperature of a chamber to which the wood-based material is added (e.g., the temperature of the atmosphere inside the chamber).

This heating may be performed at 60 to 160° C. In other words, the step 2) according to the production method of the present invention may be performed in a temperature condition of 60 to 160° C. Alternatively, the heating of the step 2) may be performed in a temperature condition of 70 to 180° C., 70 to 170° C., 70 to 160° C., 80 to 160° C., 80 to 150° C., 80 to 140° C., or 80 to 120° C. The heating of the step 2) may also be performed at, for example, 90 to 140° C., 100 to 140° C., 110 to 140° C., or 120 to 140° C. Such a heating condition can assist a more preferred modification of the wood-based material and, for example, by a modification treatment of the wood-based material with the solution, the wood-based material is likely to be imparted with at least one preferred property selected from the group consisting of more preferred durability, hardness (partial compressive strength), and dimensional stability. Moreover, the temperature of the heating in the step 2) (e.g., chamber internal temperature) may be, for example, 60 to 250° C., 60 to 125° C., 60 to 120° C., or 60 to 100° C.

The duration of subjecting the wood-based material to the heating of the step 2) may be typically 2 to 240 hours, for example, 4 to 168 hours, 4 to 96 hours, 10 to 96 hours, to 80 hours, 10 to 48 hours, 4 to 48 hours, 4 to 30 hours, 10 to 30 hours, 4 to 24 hours, 4 to 10 hours, or 4 to 8 hours.

The heating of the step 2) may be performed in an air atmosphere. However, the atmosphere is not limited thereto, and heating at a relatively high temperature (e.g., heating at higher than 200° C.) may be performed in an inert gas atmosphere of, for example, water vapor and/or nitrogen gas.

In the heating of the step 2), the wood-based material impregnated with the solution may be dried. For example, by the heating of the step 2), the wood-based material may be dried while allowing the furan derivative of the furan derivative resinification solution impregnated thereinto to polymerize. In other words, for example, the polymerization of the furan derivative impregnated into the wood-based material is allowed to proceed by performing a heat treatment, in which a chamber to which the wood-based material impregnated with the furan derivative resinification solution is added has a temperature condition of 60 to 160° C. (e.g., a process temperature condition of 80 to 160° C., 80 to 150° C., 90 to 150° C., 90 to 120° C., 90 to 110° C., 100 to 150° C., 110 to 140° C., or 120 to 140° C.), for a period of 2 to 260 hours, or 2 to 240 hours (e.g., 3 to 192 hours, 3 to 168 hours, 4 to 168 hours, 4 to 96 hours, 10 to 96 hours, 10 to 80 hours, 10 to 48 hours, 4 to 48 hours, 4 to 30 hours, 10 to 30 hours, 4 to 24 hours, 4 to 10 hours, or 4 to 8 hours), and the wood-based material (wetted due to impregnation with the solution) may be dried concurrently with or after the heat treatment.

In a preferred mode, prior to the heating of the step 2), the wood-based material may be subjected to a warming treatment at a warming temperature of lower than the temperature of the heating. In other words, upon the heat treatment, the "wood-based material impregnated with the solution" may be once subjected to a certain "initial set temperature" condition. By subjecting the wood-based material to this "initial set temperature" (i.e. a warming treatment at the initial set temperature), the stabilizer of the furan derivative resinification solution may be at least partially decomposed in the wood-based material impregnated with the solution. By subjecting the wood-based material to the "initial set temperature", for example, the stabilizer in the furan derivative resinification solution can be at least partially decomposed while minimizing as much as possible the vaporization of the solution from the wood-based material impregnated with the solution, and this can assist a more preferred modification of the wood-based material. In other words, by a modification treatment of the wood-based material with the solution, the wood-based material is likely to be imparted with at least one preferred property selected from the group consisting of more preferred durability, hardness (partial compressive strength), and dimensional stability.

In the warming treatment at the "initial set temperature", the stabilizer (i.e. the inorganic salt inhibiting polymerization of the furan derivative at normal temperature) in the furan derivative resinification solution may be at least partially or entirely decomposed by, for example, warming the wood-based material impregnated with the furan derivative resinification solution in the solution such that vaporization of the solution is minimized as much as possible.

The initial set temperature may be lower than the temperature of the heating in the step 2). For example, the initial set temperature may be equal to or lower than 80% of the temperature of the heating in the step 2) (i.e. an upper limit value of the initial set temperature may be a temperature corresponding to 80% of the temperature of the heating), and a lower limit value thereof may be a temperature equivalent to 20% of the temperature of the heating in the step 2). In other words, when the initial set temperature and the temperature of the heating in the step 2) are denoted as $T_i$ and $T_{ii}$, respectively, $T_i$ may be $0.2T_{ii}$ to $0.8T_{ii}$ ($T_i$=$0.2T_{ii}$ to $0.8T_{ii}$), for example, $T_i$=$0.3T_{ii}$ to $0.8T_{ii}$, $0.4T_{ii}$ to $0.75T_{ii}$, $0.35T_{ii}$ to $0.7T_{ii}$, $0.4T_{ii}$ to $0.7T_{ii}$, $0.2T_{ii}$ to $0.6T_{ii}$, $0.3T_{ii}$ to $0.6T_{ii}$, or $0.3T_{ii}$ to $0.5T_{ii}$.

As merely an example, the initial set temperature (e.g., the chamber temperature condition set as the initial set temperature) may be 50 to 100° C., for example, 50 to 90° C., 50 to 85° C., 55 to 85° C., or 55 to 80° C. The duration of subjecting the wood-based material to a treatment at this initial set temperature may be typically 1 to 120 hours, for example, 4 to 72 hours, 6 to 60 hours, 10 to 60 hours, 20 to 60 hours, 35 to 60 hours, or 40 to 60 hours.

As an example of one mode relating to the treatment at the initial set temperature, the production method of the present invention may further include, between the step 1) and the step 2), for example, once warming the wood-based material impregnated with the furan derivative resinification solution to 50 to 100° C., 50 to 90° C., 50 to 85° C., 55 to 85° C., 55 to 80° C., or 50 to 70° C.

Solution of Present Invention

The solution according to the present invention is a furan derivative resinification solution that is preferably used in the above-described production method.

In other words, the solution of the present invention is a solution for modifying a wood-based material, which is a furan derivative resinification solution that contains a furan derivative, an inorganic salt inhibiting polymerization of the furan derivative at normal temperature, and an inorganic salt accelerating polymerization of the furan derivative.

As described above, this solution preferably contains two kinds of salts as solute components other than the furan derivative. In other words, the furan derivative resinification solution according to the present invention contains a combination of two kinds of inorganic salts, which are an "an inorganic salt inhibiting polymerization of the furan derivative at normal temperature" and an "inorganic salt accelerating polymerization of the furan derivative". This solution is thus a more preferred wood-based material modification liquid: For example, by using the solution of the present invention to perform a modification treatment of a wood-based material, the wood-based material can be imparted with at least one property selected from the group consisting of more preferred durability, hardness (partial compressive strength), and dimensional stability.

The solution of the present invention preferably does not contain any organic solvent such as an alcohol (e.g., methanol, ethanol, or isopropanol) or acetone. In other words, as described above, a solvent contained in the solution of the present invention may be an aqueous medium consisting of water. This makes the solution of the present invention a more preferred wood-based material modification liquid and, as described above, a more prominent wood-based material modification effect can be obtained. The concentration of water in this furan derivative resinification solution may be 50% by weight or higher based on the whole solution, and an upper limit value thereof may be, but not particularly limited to, for example, 80% by weight, 75% by weight, 60% by weight, or 55% by weight (this upper limit value may be exclusive of the numerical value itself).

In a preferred mode, the concentration of the "inorganic salt inhibiting polymerization of the furan derivative at normal temperature" in the solution of the present invention may be 0.0001 to 0.004 mol with respect to 1 mol of the furan derivative contained in the solution. Further, the concentration of the "inorganic salt accelerating polymerization of the furan derivative" in the solution of the present invention may be 0.001 to 0.1 mol with respect to 1 mol of the furan derivative contained in the solution.

In a preferred mode, the content or concentration of the "inorganic salt inhibiting polymerization of the furan derivative at normal temperature" in the solution of the present invention may be less than or lower than the content or concentration of the "inorganic salt accelerating polymerization of the furan derivative". More specifically, in the furan derivative resinification solution, the molar amount of the "inorganic salt inhibiting polymerization of the furan derivative at normal temperature" with respect to 1 mol of the furan derivative may be less than the molar amount of the "inorganic salt accelerating polymerization of the furan derivative" with respect to 1 mol of the furan derivative. When the two kinds of inorganic salts have such a relative content relationship, the solution is likely to be more preferred as a modification liquid and, by using the solution to perform a modification treatment of a wood-based material, the wood-based material is likely to be imparted with at least one property selected from the group consisting of more preferred durability, hardness (partial compressive strength), and dimensional stability.

The solution of the present invention is preferably characterized at least in that it has a high stability. Therefore, even when the solution of the present invention is stored over a relatively long period (e.g., even when a long time is required between the preparation of the solution and the use of the solution as expected in the actual production or the like), inconvenient polymerization of the furan derivative is likely to be inhibited, so that the furan derivative resinification solution can be used in a more preferred state for a modification treatment. In the furan derivative resinification solution of the present invention, for example, turbidity, insolubilization, and/or separation do not occur even after a lapse of preferably 7 days at normal temperature (more preferably 14 days at normal temperature) from its preparation (i.e. turbidity, insolubilization, and/or separation do not occur in the solution at a point immediately after a lapse of at least 7 days, or 14 days; e.g., it can be judged at least visually that turbidity, insolubilization, and/or separation have not occurred in the solution).

Such a furan derivative resinification solution having a relatively high stability is particularly beneficial in view of industrial or practical treatment and production. This is because such a solution, even in the mass production of a modified wood-based material, can reduce variation in the properties of the resulting modified products in a more preferred manner. For example, an inconvenient event where the resulting modified products are hardly marketable due to the occurrence of large lot-to-lot variation in dimensional stability, hardness, or durability/decay resistance is likely to be avoided.

Other matters relating to the solution of the present invention, such as further details and more concrete modes, are described above in the section of [Production Method of Present Invention]; therefore, description thereof is omitted here for the sake of avoiding redundancy.

[Modified Wood-Based Material of Present Invention]

The modified wood-based material according to the present invention is a modified wood-based material obtained by the above-described production method. In other words, the modified wood-based material of the present invention is a wood-based material which is modified by the above-described production method and contains at least a polymerized furan derivative.

More specifically, the modified wood-based material of the present invention is a wood-based material that has been modified with a "furan derivative resinification solution that contains a furan derivative, an inorganic salt inhibiting polymerization of the furan derivative at normal temperature, and an inorganic salt accelerating polymerization of the furan derivative". Therefore, the modified wood-based material of the present invention contains at least a furan resin formed by polymerization of the furan derivative and, in a preferred case, the modified wood-based material of the present invention may contain, for example, the above-described inorganic salts used as raw materials (first inorganic salt and/or second inorganic salt), or substances derived therefrom. It is noted here that the resin formed by polymerization is not necessarily limited to a resin belonging to the category of polymers, and may at least partially contain a resin belonging to the category of polymers.

In a preferred mode, the modified wood-based material of the present invention can exhibit at least one of the following physical properties.

(Weight Percent Gain/WPG)

The weight percent gain (WPG) is 20 to 100%, for example, to 90%, or 30 to 70%

$$\text{Weight percent gain (WPG) (\%)}=[(W_t-W_0)/W_0]\times 100 \quad \text{Equation (1)}$$

(wherein, $W_t$ represents a total dry weight (g) of a modified material, and $W_0$ represents a total dry weight (g) of a pre-modification material (or unmodified wood-based material))

(Bulking/B)

The bulking (B) (%) is 1 to 14%, for example, 2 to 10%, or 4 to 8%

$$\text{Bulking } (B) \text{ (\%)}=[(S_t-S_0)/S_0]\times 100 \quad \text{Equation (2)}$$

(wherein, $S_t$ represents an end-grain area ($mm^2$) of a completely-dry modified material, and $S_0$ represents an end-grain area ($mm^2$) of a completely-dry pre-modification material (or unmodified wood-based material))

(Anti-Swelling Efficiency/ASE)

The anti-swelling efficiency (ASE) is 50% or higher, for example, 50 to 70%, 50 to 65%, or 50 to 60%

$$\text{Anti-swelling efficiency (ASE) (\%)}=[(S_c-S_t)/S_c]\times 100 \quad \text{Equation (3)}$$

(wherein, $S_t$ represents an end-grain surface swelling rate (%) of a modified material with moisture absorption or water absorption from a completely dry state under certain conditions, and $S_c$ represents an end-grain surface swelling rate (%) of a pre-modification material (or unmodified wood-based material) with moisture absorption or water absorption from a completely dry state under the same certain conditions as the modified material)

The anti-swelling efficiency ASE serves as an index of the dimensional stability. An ASE of 50% or higher is preferred for practical use of the modified wood-based material, whereas an ASE of less than 50% is unsuitable/inappropriate for practical use.

It is noted here that the term "completely-dry" or "completely dry state" used herein refers to a state in which a modified material, an unmodified material, or the like placed in an incubator set at 105° C. (model: DN43, manufactured by Yamato Scientific Co., Ltd.) no longer shows a change in weight. Further, the term “total dry weight” used herein refers to the weight of a material that no longer shows a change in weight.

(Hardness/Partial Compressive Strength)

The partial compressive strength of the wood-based material, which is determined in accordance with the following test method, is preferably 1.4 times or more, for example, 1.5 to 3 times, or 1.6 to 2.5 times.

The modified wood-based material is humidity-conditioned and subsequently subjected to partial compressive strength tests in accordance with JIS Z2101 using a precision universal tester (AUTOGRAPH) manufactured by Shimadzu Corporation. The head speed is set at 2 mm/min, and a test using a flat-grain surface as a compression surface and a test using a straight-grained surface as a compression surface are conducted.

The value of the partial compressive strength determined by these tests in accordance with JIS Z2101 is compared with the value of the partial compressive strength that is determined in the same manner using a pre-modification or unmodified wood-based material. Specifically, the ratio of the partial compressive strength of the modified wood-based material with respect to that of the pre-modification wood-based material (or unmodified wood-based material) is calculated (Value (ratio) of partial compressive strength=Partial compressive strength of modified wood-based material/Partial compressive strength of pre-modification or unmodified wood-based material).

As seen from this test method, the partial compressive strength serves as an index of the hardness of the wood-based material. When this value (ratio) of the partial compressive strength is 1.4 times or more, the modified wood-based material is preferred for practical use (in various actual applications).

(Durability/Decay Resistance or Rot resistance)

The average mass decrease rate, which is determined in accordance with JIS K1571 “Wood Preservatives—Performance Requirements and Their Test Methods for Determining Effectiveness”, 5.2 Antiseptic Performance, 5.2.1 Indoor Test, 5.2.1.1 Injection Treatment, is 3% or lower.

As a more specific method, a modified wood-based material subjected to a modification treatment is inoculated with bacteria (test bacteria: *Fomitopsis palustris* and *Trametes versicolor*) and then placed in an environment having a temperature of 26±2° C. and a relative humidity of 70% or higher for 12 weeks. Subsequently, the average mass decrease rate of the modified wood-based material is calculated from the change in weight before and after this treatment.

When the average mass decrease rate is 3% or lower, the modified wood-based material is preferred for practical use (in various actual applications).

In a preferred mode, the modified wood-based material according to the present invention may be a wood-based material used for a flooring material, a deck (e.g., wood deck), an exterior wall material, a louver, a furniture, a truck body, a wooden fence, a guardrail, an exterior material, and/or a musical instrument.

The modified wood-based material of the present invention can have the above-described preferred properties, and thus can be particularly preferably used as a wood material for not only indoor applications but also outdoor applications. Further, when the modified wood-based material of the present invention is composed of a coniferous material, it can have, for example, durability and/or hardness (partial compressive strength) that are equivalent to those of a tropical hardwood material, and/or good dimensional stability and the like. Therefore, the present invention can be said to also contribute to providing a novel use and added value for conifers (e.g., domestic conifers).

Other specific matters relating to the modified wood-based material of the present invention, such as additional modes, are directly or indirectly described above in the sections of [Production Method of Present Invention] and [Solution of Present Invention]; therefore, description thereof is omitted here for the sake of avoiding redundancy.

Thus far, one embodiment of the present invention has been described; however, it is nothing more than a typical example by any means. Accordingly, the present invention is not limited thereto, and a person of ordinary skill in the art will easily appreciate that various modes, modifications, and the like are conceivable.

For example, the effects described herein are merely examples, and the effects of the present invention are not necessarily limited thereto and may include additional effects.

Further, for example, the furan derivative resinification solution described in relation to the present invention contains a furan derivative, an inorganic salt inhibiting polymerization of the furan derivative at normal temperature, and an inorganic salt accelerating polymerization of the furan derivative; however, the presence of a component that may be unavoidably or accidentally incorporated during preparation, storage, and/or use of the solution (e.g., a component that can be recognized in a trace or infinitesimal amount by a person of ordinary skill in the art, such as a trace or infinitesimal component) is acceptable.

For the sake of confirmation, it is noted here that the present invention can encompass the following modes.

First mode: a method of modifying a wood-based material, the method including: 1) impregnating a wood-based material with a furan derivative resinification solution that contains a furan derivative, an inorganic salt inhibiting polymerization of the furan derivative at normal temperature, and an inorganic salt accelerating polymerization of the furan derivative; and 2) polymerizing the furan derivative in the furan derivative resinification solution impregnated into the wood-based material within the wood-based material by means of heating.

Second mode: the method according to the first mode, wherein the inorganic salt inhibiting polymerization of the furan derivative at normal temperature is at least one selected from ammonium carbonate and ammonium hydrogen carbonate.

Third mode: the method according to the first or the second mode, wherein the inorganic salt accelerating polymerization of the furan derivative is an inorganic salt formed of an anion selected from a chloride ion and a sulfate ion, and a cation selected from an ammonium ion, a magnesium ion and a hydrogen ion.

Fourth mode: the method according to any one of the first to the third modes, wherein the wood-based material is a coniferous material.

Fifth mode: a furan derivative resinification solution used in a method of modifying a wood-based material, the solution containing: a furan derivative; an inorganic salt inhibiting polymerization of the furan derivative at normal temperature; and an inorganic salt being neutral to weakly acidic at normal temperature and accelerating polymerization of the furan derivative.

Sixth mode: a wood-based material containing at least a polymerized furan derivative, the wood-based material being modified by the method according to any one of the first to the fourth modes, or modified with the furan derivative resinification solution according to the fifth mode.

EXAMPLES

Various verification experiments were conducted in relation to the present invention.

Various components were selected in order to verify the stability of a furan derivative resinification solution and a wood-based material modification effect exerted by the solution. The wood-based material modification effect by resinification was evaluated in terms of the following items.

Dimensional stability (anti-swelling efficiency)

Hardness (partial compressive strength)

Durability (decay resistance)

<<Investigation Regarding Combination of Stabilizer and Accelerator in Furan Derivative Resinification Solution>>

As Examples 1 to 9 and Comparative Examples 1 to 4, a wood-based material was resinified using each of the following furan derivative resinification solutions to evaluate the modification effect.

Furan Derivative Resinification Solutions

Furan derivative: furfuryl alcohol (FA)

Stabilizer (polymerization-inhibiting inorganic salt): ammonium carbonate, ammonium hydrogen carbonate, sodium hydroxide, potassium hydroxide Accelerator (polymerization-accelerating inorganic salt and organic acid): ammonium chloride, magnesium chloride, magnesium sulfate, ammonium sulfate, ammonium hydrogen sulfate, magnesium hydrogen sulfate, citric acid, maleic anhydride Solvent: aqueous solvent (100% by weight of water as a solvent of each solution)

Wood-based material: Japanese cedar material, Japanese cypress material

Specifically, to an aqueous furfuryl alcohol solution having a FA concentration of 30% by weight (based on the whole solution), 0.0008 mol of a stabilizer and 0.01 mol of an accelerator were added per 1 mol of furfuryl alcohol to prepare each furan derivative resinification solution. As a solvent in the solution, an aqueous solvent consisting of water was used.

A modification treatment of a wood-based material was attempted using a chamber to which the furan derivative resinification solution and the wood-based material were added (a chamber equipped with mechanisms for heating and decompression/compression).

Specifically, a Japanese cedar material or a Japanese cypress material, which had an end-grain shape of 30 mm in both the tangential and radial directions and 6 mm in the grain direction (i.e. 30 mm×30 mm×6 mm in dimensions), was immersed in the above-prepared furan derivative resinification solution to perform vacuum-injection at 30 hPa for 2 hours.

Thereafter, the thus treated Japanese cedar material or Japanese cypress material was subjected to a warming treatment at an initial set temperature of 60° C. for 48 hours, and the furan derivative impregnated into this wood-based material was subsequently polymerized by 24-hour heating at 130° C. to attempt a modification of the wood-based material.

Evaluation Items of Modification Effect

Dimensional stability (ASE): Using an incubator set at 105° C. (model: DN43, manufactured by Yamato Scientific Co., Ltd.), the wood-based material subjected to the modification treatment was brought into a completely dry state where a change in weight was no longer observed. For this modified wood-based material (Japanese cedar material or Japanese cypress material) in the completely dry state, the dimensions in the tangential and radial directions were measured to determine the end-grain surface area.

Subsequently, the modified wood-based material in the completely dry state was immersed in deionized water to attempt vacuum injection (at 30 hPa or less for 2 hours). The modified wood-based material was left to stand in the water for a prescribed period (a whole day and night, i.e. whole 24 hours) and then taken out, and the dimensions were measured in the same manner in a water-saturated state to determine the end-grain surface area. From the thus obtained values, the rate (%) of end-grain surface swelling caused by the treatment from the completely dry state to the water-saturated state was determined. This rate was compared with that of the wood-based material not subjected to the modification treatment to determine the ASE (anti-swelling efficiency) (%) based on the above-described equation (3).

○: 50% or higher x: less than 50%

Hardness (partial compressive strength): A resinified test specimen was humidity-conditioned for one month at 20° C. under a relative humidity of 60% or lower, and subsequently subjected to partial compressive strength tests in accordance with JIS Z2101 using a precision universal tester (AUTOGRAPH) manufactured by Shimadzu Corporation. The head speed was set at 2 mm/min, and a test using a flat-grain surface as a compression surface and a test using a straight-grained surface as a compression surface were conducted to determine the partial compressive strength. This value was compared with that of the wood-based material not subjected to the modification treatment (unresinified and unmodified test specimen) to determine a partial compressive strength ratio (times). It is noted here that, in this evaluation of the "partial compressive strength", a wood-based material having dimensions of 23 mm×23 mm×90 mm was used. More specifically, as for the modified test specimen, a wood-based material of 23 mm×23 mm×400 mm in dimensions was subjected to the modification treatment and then cut out into a piece of 23 mm×23 mm×90 mm, and this piece was subjected to the above-described tests to determine the partial compressive strength.

○: The partial compressive strength of the resinified test specimen was 1.4 times or more of that of the unresinified test specimen.

x: The partial compressive strength of the test specimen was less than 1.4 times of that of the untreated test specimen.

Durability (Decay Resistance/Rot Resistance):

The decay resistance of a test specimen was evaluated in accordance with JIS K1571 "Wood Preservatives—Performance Requirements and Their Test Methods for Determining Effectiveness", 5.2 Antiseptic Performance, 5.2.1 Indoor Test, 5.2.1.1 Injection Treatment. Specifically, a modified test specimen subjected to the modification treatment was inoculated with bacteria and then placed in an environment having a temperature of 26±2° C. and a relative humidity of 70% or higher for 12 weeks. Subsequently, the average mass decrease rate was calculated from the change in the weight of the modified test specimen. As test bacteria, *Fomitopsis palustris* and *Trametes versicolor* were used (these test bacteria were confirmed to have a desired activity by performing the same treatment as described above for an unmodified Japanese cedar sapwood test specimen that had not been subjected to the modification treatment; specifically, by performing the same treatment as described above, it was confirmed that these test bacteria had a desired activity as the unmodified test specimen had an average mass decrease rate of 30% or higher for *Fomitopsis palustris* and an average mass decrease rate of 15% or higher for *Trametes versicolor*).

It is noted here that, in this evaluation of "Durability (Decay resistance/Rot resistance), a wood-based material having dimensions of 20 mm×20 mm×10 mm was used. More specifically, as for the modified test specimen, a wood-based material of 20 mm×20 mm×155 mm in dimensions was subjected to the modification treatment and then cut out into a piece of 20 mm×20 mm×10 mm, and this piece was subjected to the above-described test to understand the durability.

○: The average mass decrease rate of the modified test specimen was 3% or lower.

x: The average mass decrease rate of the modified test specimen was higher than 3%

Solution Stability:

The stability of each furan derivative resinification solution as a solution was evaluated.

○: When the resinification solution, after its preparation, was left to stand at normal temperature under the atmospheric pressure, neither insolubilization nor separation of the solution occurred even in a period after at least one week from the preparation (immediately after a lapse of at least one week).

x: When the resinification solution, after its preparation, was left to stand at normal temperature under the atmospheric pressure, insolubilization or separation of the solution occurred within a period of less than one week from the preparation.

Overall Evaluation

○: No item was given an evaluation of "x".

x: One or more items were given an evaluation of "x".

The results are shown in Table 1 below.

TABLE 1

| | Wood-based material | Furan derivative | Stabilizer | Accelerator | Dimensional stability (ASE) | Hardness (partial compressive strength) | Durability | Solution stability | Overall evaluation |
|---|---|---|---|---|---|---|---|---|---|
| Example 1 | Japanese cedar | FA | ammonium carbonate | ammonium chloride | ○ | ○ | ○ | ○ | ○ |
| Example 2 | Japanese cypress | FA | ammonium carbonate | magnesium chloride | ○ | ○ | ○ | ○ | ○ |
| Example 3 | Japanese cedar | FA | ammonium hydrogen carbonate | magnesium chloride | ○ | ○ | ○ | ○ | ○ |
| Example 4 | Japanese cypress | FA | ammonium carbonate | ammonium chloride | ○ | ○ | ○ | ○ | ○ |
| Example 5 | Japanese cedar | FA | ammonium carbonate | magnesium chloride | ○ | ○ | ○ | ○ | ○ |
| Example 6 | Japanese cedar | FA | ammonium carbonate | magnesium sulfate | ○ | ○ | ○ | ○ | ○ |
| Example 7 | Japanese cedar | FA | ammonium carbonate | ammonium sulfate | ○ | ○ | ○ | ○ | ○ |
| Example 8 | Japanese cedar | FA | ammonium hydrogen carbonate | ammonium hydrogen sulfate | ○ | ○ | ○ | ○ | ○ |
| Example 9 | Japanese cedar | FA | ammonium carbonate | magnesium hydrogen sulfate | ○ | ○ | ○ | ○ | ○ |
| Comparative Example 1 | Japanese cedar | FA | ammonium carbonate | citric acid | x | x | x | x | x |
| Comparative Example 2 | Japanese cedar | FA | ammonium carbonate | maleic anhydride | x | x | x | x | x |
| Comparative Example 3 | Japanese cedar | FA | sodium hydroxide | ammonium chloride | x | x | x | ○ | x |
| Comparative Example 4 | Japanese cedar | FA | potassium hydroxide | ammonium chloride | x | x | x | ○ | x |

As seen from the results shown in Table 1, particularly the following matters were understood:

As a combination of the stabilizer and the accelerator, a combination of an inorganic salt such as ammonium carbonate or ammonium hydrogen carbonate (an inorganic salt inhibiting polymerization of the furan derivative at normal temperature) and an inorganic salt formed of an anion such as a chloride ion and/or a sulfate ion, and a cation such as an ammonium ion, a magnesium ion, and/or a hydrogen ion (inorganic salt accelerating polymerization of the furan derivative) yielded favorable test results.

Sodium hydroxide and potassium hydroxide maintained the solution stability; however, the polymerization of the furan derivative was inconveniently inhibited when each resinification solution was applied to the wood-based material, and desired effects were not achieved.

In those cases where an organic acid such as citric acid or maleic anhydride was used as the accelerator, insolubilization and separation of each aqueous solution occurred within a short time, and desired effects were not achieved when each resinification solution was applied to the wood-based material.

Even when the tree species was changed from Japanese cedar to Japanese cypress, comparable and favorable test results were obtained as a whole.

(Additional Investigation Regarding Wood-Based Material)

Resinification of wood-based material was performed under the same conditions as in the above-described Example 1, except that, as the wood-based material, Scots pine and Radiata Pine were used in place of Japanese cedar and Japanese cypress, respectively.

As a result, for these coniferous materials as well, the same overall evaluation with favorable test results was obtained as in the above-described Examples. Accordingly, it was found that the coniferous materials were preferably resinified and thereby attained durability and hardness equivalent to those of tropical hardwood materials.

(Additional Investigation Regarding Stabilizer Concentration)

Resinification of wood-based material was attempted under the same conditions as in the above-described Example 1, except that the stabilizer concentration was changed in a range of 0.0001 to 0.004 mol per 1 mol of furfuryl alcohol. Specifically, the stabilizer concentration was changed to 0.0001, 0.001, and 0.004 mol per 1 mol of furfuryl alcohol.

As a result, when the stabilizer concentration was 0.0001 to 0.004 mol per 1 mol of furfuryl alcohol, the same overall evaluation with favorable test results was obtained as in the above-described Examples.

(Additional Investigation Regarding Accelerator Concentration)

Resinification of wood-based material was attempted under the same conditions as in the above-described Example 1, except that the accelerator concentration was changed in a range of 0.001 to 0.1 mol per 1 mol of furfuryl alcohol. Specifically, the accelerator concentration was changed to 0.001, 0.005, and 0.1 mol per 1 mol of furfuryl alcohol.

As a result, when the accelerator concentration was 0.001 to 0.1 mol per 1 mol of furfuryl alcohol, the same overall evaluation with favorable test results was obtained as in the above-described Examples.

(Additional Investigation Regarding Initial Set Temperature)

Resinification of wood-based material was attempted under the same conditions as in the above-described Example 1, except that the initial set temperature was changed in a range of 50 to 90° C. Specifically, the initial set temperature was changed to 50° C., 70° C., 80° C., and 90° C.

As a result, when the initial set temperature was 50° C. to 90° C. (i.e. $T_i$=about $0.4T_{ii}$ to about $0.7T_{ii}$), the same overall evaluation with favorable test results was obtained as in the above-described Examples.

(Additional Investigation Regarding Heating Temperature)

Resinification of wood-based material was attempted under the same conditions as in the above-described Example 1, except that the heating temperature during polymerization was changed in a range of 80 to 160° C. Specifically, the heating temperature was changed to 80° C., 100° C., and 160° C.

As a result, when the heating temperature during polymerization was 80 to 160° C., the same overall evaluation with favorable test results was obtained as in the above-described Examples.

(Additional Investigation Regarding Presence or Absence of Accelerator)

Resinification of wood-based material was attempted under the same conditions as in the above-described Example 1, except that no accelerator was used in the solution.

As a result, the polymerization of the furan derivative of the solution impregnated into the wood-based material was relatively not accelerated as compared to Examples 1 to 9, and desired resinification was not achieved.

(Additional Investigation Regarding Solvent)

Resinification of wood-based material was attempted under the same conditions as in the above-described Example 1, except that an organic solvent was additionally used as a solvent in place of the 100%-water aqueous solvent. Specifically, resinification of wood-based material was attempted under the same conditions as in the above-described Example 1, except that a water-acetone mixed solvent (acetone content: 50% by weight with respect to the whole resinification solution) and a water-ethanol mixed solvent (ethanol content: 50% by weight with respect to the whole resinification solution) were each used.

As a result, desired resinification was not achieved due to the incorporation of an organic solvent as the solvent. Specifically, the resinification solution, because of the organic solvent such as acetone or ethanol contained therein, did not sufficiently permeate to the inside of the wood-based material, and the wood-based material was not modified in a favorable manner.

Table 2 below shows specific results particularly for the dimensional stability (ASE).

TABLE 2

| Organic solvent | Dimensional stability (ASE)/% |
|---|---|
| acetone | 35.5 |
| ethanol | 30.4 |

As seen from Table 2, the ASE was less than 50% when acetone or ethanol was contained in the solvent.

In this manner, desired resinification cannot be achieved when an organic solvent is contained as a solvent. Without being bound to a specific theory, this is presumably because, since an organic solvent has a lower polarity and a larger molecular weight than water, furfuryl alcohol did not permeate to the cell walls of the wood-based material. Alternatively, also without being bound to a specific theory, it is presumed that furfuryl alcohol was vaporized along with the organic solvent under the initial set temperature and/or the heating temperature during polymerization.

In the light of the above-described results, it was found that the furan derivative resinification solution according to the present invention, which contains a furan derivative and a combination of specific two kinds of inorganic salts, has a superior solution stability and, when used for furan resinification of a wood-based material such as a coniferous material, the furan derivative resinification solution can impart the wood-based material with preferred durability and hardness as well as preferred dimensional stability.

CROSS-REFERENCE TO RELATED APPLICATIONS

The present patent application claims priority based on Japanese Patent Application No. 2020-128665 filed on Jul. 29, 2020), which is hereby incorporated by reference in its entirety.

INDUSTRIAL APPLICABILITY

The technology according to the present invention can be utilized in wood-based material modification applications.

For example, modification of a wood-based material can make the wood-based material more suitable for outdoor use. Therefore, the present invention can be preferably utilized for not only interior materials such as furniture and flooring but also exterior materials and the like such as wood decks, particularly those wood-based materials that are used outdoors.

The invention claimed is:

1. A method of producing a modified wood-based material, the method comprising:

1) Impregnating a wood-based material with a furan derivative resinification solution that comprises a furan derivative, an inorganic salt inhibiting polymerization of the furan derivative at normal temperature, and an inorganic salt accelerating polymerization of the furan derivative; and 2) Polymerizing the furan derivative in the furan derivative resinification solution impregnated into the wood-based material within the wood-based material by means of heating, wherein the inorganic salt inhibiting polymerization of the furan derivative at normal temperature is at least one selected from ammonium carbonate and ammonium hydrogen carbonate, wherein the concentration of the inorganic salt inhibiting polymerization of the furan derivative at normal temperature is 0.0001 to 0.004 mol with respect to 1 mol of the furan derivative, and the inorganic salt accelerating polymerization of the furan derivative is an inorganic salt formed of an anion selected from a chloride ion and a sulfate ion, and a cation selected from an ammonium ion and a magnesium ion, wherein the concentration of the inorganic salt accelerating polymerization of the furan derivative is 0.001 to 0.1 mol with respect to 1 mol of the furan derivative.

2. The method according to claim 1, wherein a solvent in the furan derivative resinification solution is an aqueous medium.

3. The method according to claim 1, wherein the inorganic salt inhibiting polymerization of the furan derivative at normal temperature is an inorganic salt that is decomposed and gasified by heating.

4. The method according to claim 1, wherein the step 1) is performed under a reduced pressure of less than the atmospheric pressure.

5. The method according to claim 1, wherein the heating in the step 2) is performed at 80 to 160° C.

6. The method according to claim 1, wherein the wood-based material is a coniferous material.

7. The method according to claim 1, wherein the wood-based material is a cedar material or a cypress material.

8. The method according to claim 1, wherein the concentration of the furan derivative in the furan derivative resinification solution is 5 to 50% by weight (not inclusive of 50% by weight) based on the whole furan derivative resinification solution.

* * * * *